United States Patent
Paessler et al.

(10) Patent No.: US 6,625,980 B1
(45) Date of Patent: Sep. 30, 2003

(54) OVERPRESSURE CONTROL CIRCUIT FOR VEHICLE PNEUMATIC SYSTEM

(75) Inventors: Wolfgang Paessler, Ottersweier (DE); Daniel Konrad, Karlsruhe (DE); Jens Schrader, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 09/890,850

(22) PCT Filed: Nov. 25, 2000

(86) PCT No.: PCT/DE00/04194

§ 371 (c)(1),
(2), (4) Date: Aug. 6, 2001

(87) PCT Pub. No.: WO01/42056

PCT Pub. Date: Jun. 14, 2001

(30) Foreign Application Priority Data

Dec. 7, 1999 (DE) .......................................... 199 58 912

(51) Int. Cl.[7] .............................................. F16D 31/02
(52) U.S. Cl. .............................. 60/328; 60/409; 60/412
(58) Field of Search .......................... 60/409, 410, 412, 60/328; 91/1

(56) References Cited

U.S. PATENT DOCUMENTS 5,113,655 A * 5/1992 Schumacher et al. ......... 60/412
6,006,520 A * 12/1999 Zehnder et al. ................ 60/415

FOREIGN PATENT DOCUMENTS

| EP | 0 463353 A | | 1/1992 | |
| GB | 2210411 | * | 7/1989 | .................. 60/412 |

* cited by examiner

Primary Examiner—F. Daniel Lopez
(74) Attorney, Agent, or Firm—Michael J. Striker

(57) ABSTRACT

The invention creates a vehicle pneumatics overpressure regulating circuit 1 of a supply device of a pneumatic consumer 5 in a vehicle with an operating pressure. The overpressure circuit 1 has a compressed air source 3, which furnishes compressed air for the consumer 5; a pressure switch 8, by means of which the compressed air source 3 is turned on and/or off to supply the consumer 5 with compressed air; and a supply line 4, by way of which compressed air can be carried from the compressed air source 3 to the consumer 5. The pressure switch 8 can be subjected to a measured pressure via a pneumatic measurement line 7, which is separate from the supply line, and this measured pressure characterizes a state of the operating pressure of the consumer. As a result, extremely precise regulation of the requisite operating pressure is successfully achieved.

7 Claims, 2 Drawing Sheets

OVERPRESSURE CONTROL CIRCUIT FOR VEHICLE PNEUMATIC SYSTEM

Figure 1:
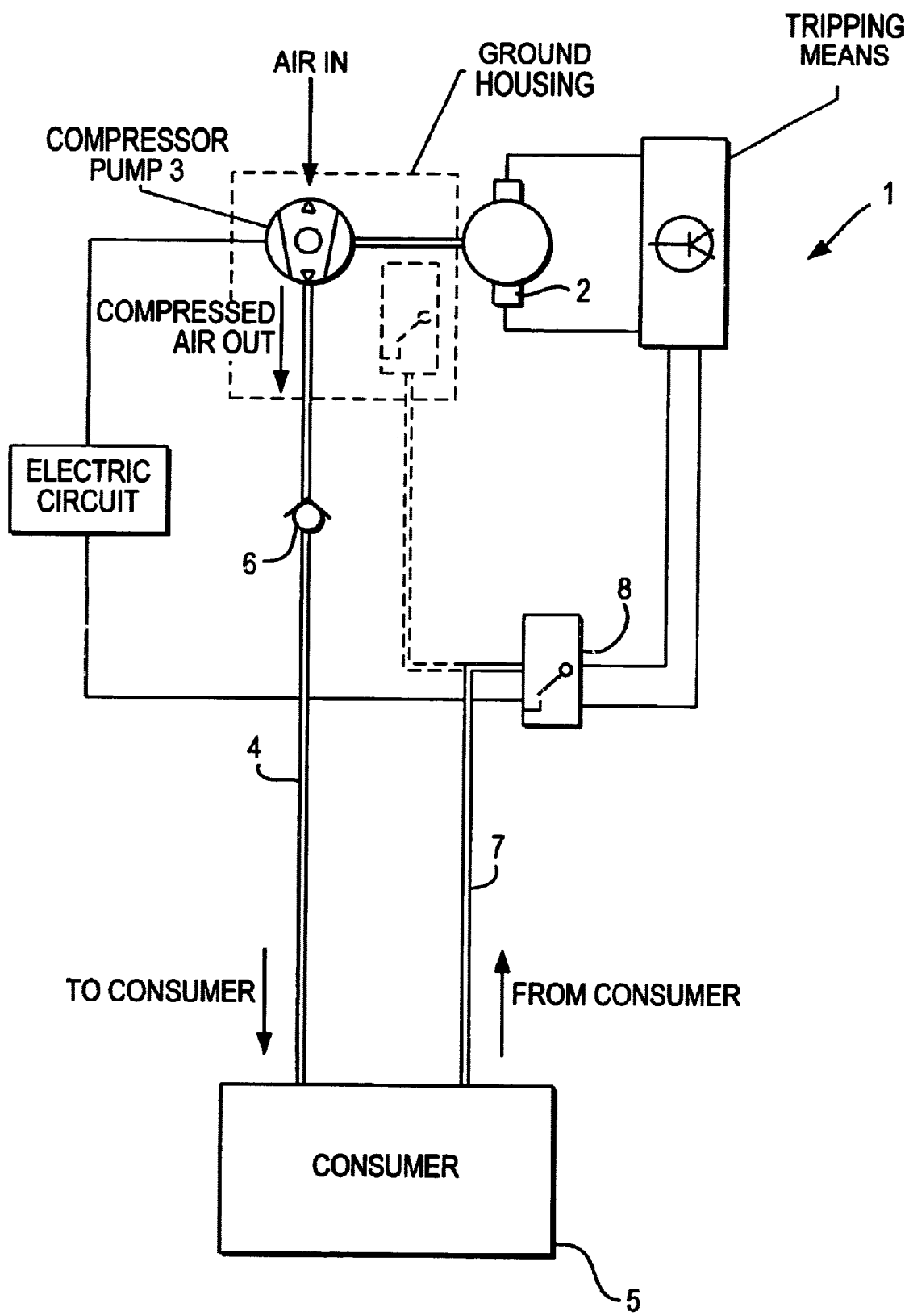

The present invention relates to a vehicle pneumatics overpressure regulating circuit. This circuit is used to supply a pneumatic consumer of a vehicle with an operating pressure, the consumer being disposed in an interior. The interior is the passenger compartment. The overpressure regulating circuit has a compressed air source, which furnishes compressed air for the consumer. The overpressure regulating circuit also has a pressure switch, by means of which the compressed air source is turned on or off to supply the compressed air, and also has a supply line by way of which compressed air from the compressed air source can be carried to the consumer.

Until now, to supply pneumatic consumers in an interior of a vehicle, pressure switch assemblies were used in which either the pressure switch is disposed immediately downstream of the compressor, or the pressure switch is located directly on the consumer.

ADVANTAGES OF THE INVENTION

The vehicle pneumatics overpressure regulating circuit makes it possible for the pressure switch to be switched extremely precisely, by means of a disposition of a pneumatic measurement line that is separate from a supply line. As a result, the switch is independent of line segments or throttles disposed downstream of a compressed air source. While these otherwise lead to the buildup of a head pressure, as a result of which a pressure switch point at a pressure switch is reached, which is located earlier than without these line segments or throttles, the measurement line assures a direct measurement of the consumer, so that variations, of the kind that otherwise are caused by an engine or pump characteristic curve and a temperature of the compressed air in the supply line, do not occur. The proposed arrangement is also distinguished in that it is extremely robust, since the measurement line is independent of the supply line. This robustness, which is also due to the fact that the pressure switch is not exposed to dirt and weathering, is also exploited by the proposed method for operating a vehicle pneumatics overpressure regulating circuit of a pneumatic consumer, which can be accommodated in the engine compartment as well, for instance in the form of a pneumatic actuator with triggering via an electromagnet valve, in a vehicle and in particular in its interior. Thus such pneumatic consumers as central locking control elements and inflatable compartments in seat cushions and/or back rests in the vehicle can be controlled and regulated very precisely with regard to their demand for compressed air.

An especially advantageous feature provides that the compressed air source, in particular an air compressor, such as a vane cell or diaphragm pump, and the pressure switch itself are both placed in a common housing. In this way it is successfully possible to assure a compact construction, which makes a separation from the consumer possible. This is reinforced on the one hand by interchangeability of all of these components and by reduced expense for necessary sound damping means. The pneumatically operated elements are located in the sole housing, so that only this housing has to be provided with an appropriate sound damping means. This sound damping means in particular involves only slight expense whenever the consumer is located at an acoustically exposed place, while the housing with the components is disposed separately and at a distance from it.

It is also expedient if the pressure switch and the compressed air source or a tripping means for the compressed air source are connected to an electronic control unit with safety functions, in particular leak detection. That is, the compressed air source (pump), after a programmed running time during which the pressure-dictated shutoff point is not reached has been exceeded, is shut off (leakage or pump malfunction). The pressure switch, such as a mechanical pressure switch, has a turn-on and turn-off point, which in particular is adjustable. These switching points are evaluated as electrical signals by an electronic trigger means for the compression, which can for instance be an analog circuit. If a desired minimum operating pressure, based on a measured pressure imposed in the pneumatic measurement line, proves to be too low, the pressure switch trips an electrical signal, so that the compressed air source begins to supply the requisite demand for compressed air for the consumer. To that end, using a dual-pressure pump or a compressor, for instance, the signal that indicates a demand for compressed air can trip a switch contact for starting up the compressor. In a further feature, the compressed air source itself can be a reservoir from which the demand for compressed air is met. The compressed air reservoir itself is in turn filled with compressed air as needed via a suitable compressor.

DRAWINGS

Figures 2, 3:
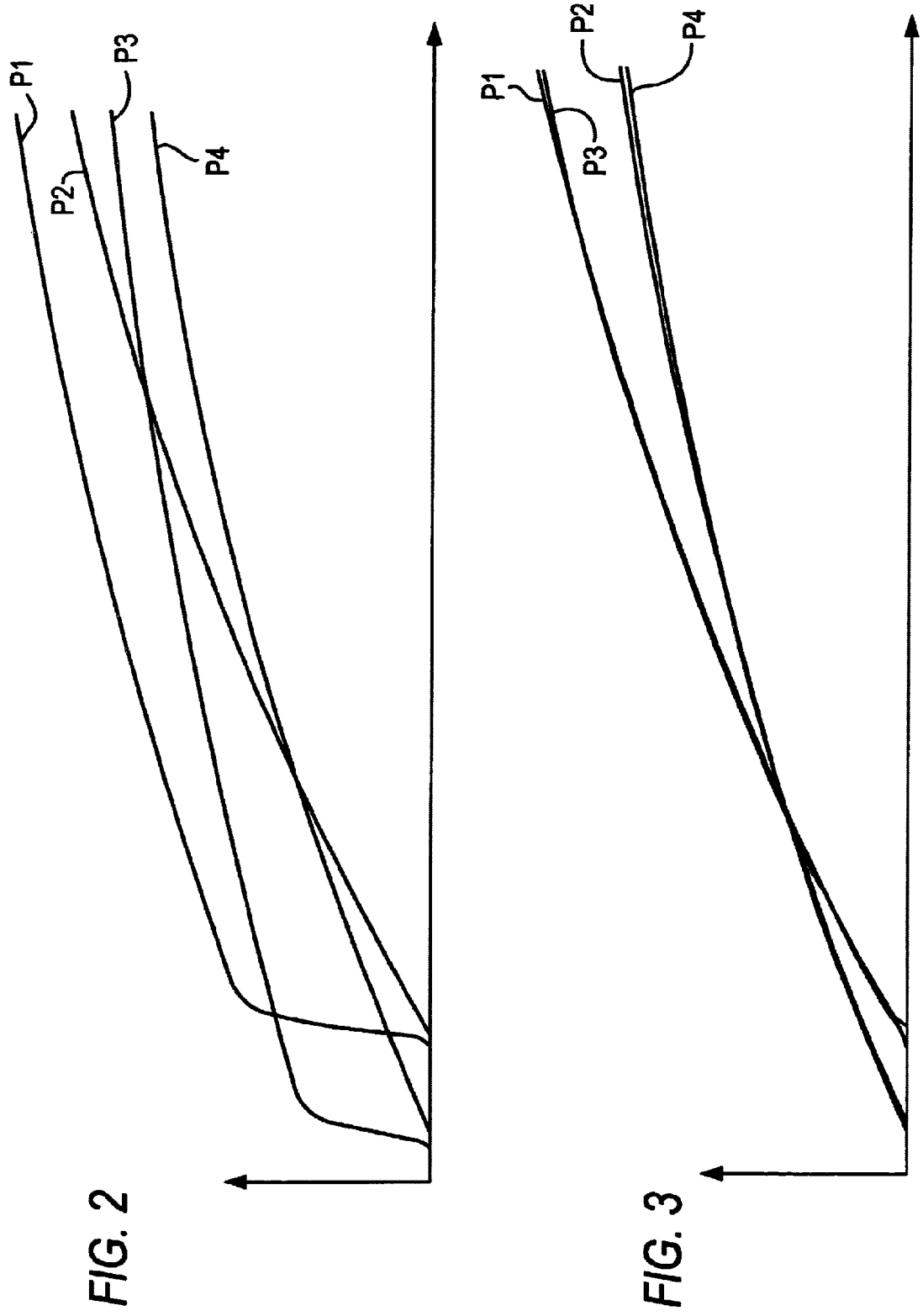

Further advantageous features and refinements as well as expedient characteristics of the invention are explained in further detail in the ensuing drawing. Shown are:

FIG. 1, a circuit diagram of a vehicle pneumatics overpressure regulating circuit;

FIG. 2, a pressure increase in an overpressure regulating circuit of the prior art; and FIG. 3, a pressure increase in an overpressure regulating circuit of the present invention.

DESCRIPTION OF THE PREFERRED EXEMPLARY EMBODIMENTS

FIG. 1 shows a vehicle pneumatics overpressure regulating circuit 1. This overpressure regulating circuit 1 has an electric motor 2, which drives a pump 3. The pump 3 is connected by means of a supply line 4 to a consumer 5. Via the supply line 4, the consumer 5 receives compressed air, so that a required operating pressure of the consumer 5 can be met. A check valve 6 is provided in the supply line 4 between the pump 3 and the consumer 5. Since the consumer 5 uses the compressed air supplied to it for various purposes, for instance for opening a door locking system, adjusting a driver's seat, or other compressed air-operated adjusting options which are operated particularly in a passenger compartment of a vehicle, the operating pressure in the consumer 5 finally drops below a minimum operating pressure. By means of a measurement line 7, a pressure switch 8 is now subjected to a measured pressure. The measured pressure characterizes a state of the operating pressure of the consumer 5. The pressure switch 8 has only one pair of contacts; that is, it is capable of establishing or interrupting a flow of electric current. For interrupting this flow, a pump rundown time of 0.4, for instance, is programmed in so that the contacts will be securely disconnected.

However, in a pressure switch with two pairs of contacts, it is also possible for the measured pressure to indicate the operating pressure directly. To that end, the measurement line 7 is for instance equipped as a return line, with the operating pressure prevailing in the measured pressure 5. The pressure switch 8 is capable of reacting to the operating pressures imposed on it. If a minimum pressure is undershot, a turn-on point is realized. The pressure switch 8 trips a signal by which the consumer 5 is resupplied with compressed air. This compressed air supply persists preferably until such time as a maximum pressure is present at the pressure switch 8. A second signal is then tripped, which causes a supply of compressed air to the consumer 5 to be disrupted again. The pressure switch 8 thus, when two pairs of contacts are present, preferably has one turn-on point and one turn-off point. In particular, these points are adjustable, so that a pressure switch 8 can be compatible for a plurality of consumers. The possibility also exists of adjusting the pressure switch 8 variably with regard to its switching points in such a way that environmental factors, such as high temperatures or the like, that affect the operating pressure in the consumer 5 can also be detected.

FIG. 2 shows a coordinate system, in which the X axis indicates the time, while the Y axis indicates the pressure that prevails in an overpressure regulating circuit. The time/pressure behavior shown in FIG. 2 has been picked up from a vehicle pneumatics overpressure regulating circuit of the kind known from the prior art. The pressure switch in that case was connected directly to the supply line downstream of the pump. The pressure courses indicated represent the buildup of a head pressure in the supply line. The pressures sense by the pressure switch are marked P1 and P2. The operating pressures prevailing at the consumer are conversely designated as P3 and P4.

FIG. 2 also shows two different modes of operation. The first mode of operation obtains in operation of the electric motor, which drives the pump, at a lesser voltage, compared to the second mode of operation with a higher voltage. This can be seen from the higher pressure that builds up at the higher engine voltage employed. The pressures P1 and P3 were picked up at this higher operating voltage, while the pressures P2 and P4 were generated at a lower operating voltage of the electric motor. FIG. 2 now shows that there is a not inconsiderable distance between the pressure at the consumer, such as P3, and the pressure sensed by the pressure switch in the supply line, that is, P1, thus causing a variation in the regulation of the operating pressure and of the consumer. The difference between the operating pressure P3 and the measured pressure P1 can for instance be between 50 and 200 mbar, and with a brief buildup of the operating pressure, for instance on the order of magnitude of 0.1 to 1 second, very much greater variations occur than in later pressure measurements. It must also be noted that the higher the pressure required by the consumer, the greater is also the variation between the operating pressure and the pressure, sensed by the pressure switch, in the supply line. The pressure difference depends substantially on the slope of the pump characteristic curve and on the cross section of the pneumatic line as well and thus on the tube friction and throttling.

FIG. 3 shows the behavior of the overpressure regulating circuit claimed herein; this time, the pressure P1 and P2 picked up at the pressure switch is imposed via a pneumatic measurement line, separate from the supply line, by way of which measurement line the state of the operating pressure of the consumer is characterized. The designations of the pressures P1 through P4 are in accordance with those of FIG. 2. It must be noted that the proposed overpressure regulating circuit makes it possible to assure an extremely precise triggering of the pressure switch, so that the consumer always receives the necessary operating pressure. Any variation between the pressure P1 at the pressure switch and the pressure P3 at the consumer is extremely slight and is now quasi-undetectable. This makes a precise adjustment of the pressure switch possible, thus assuring that not only a minimum pressure in the consumer but also a maximum pressure are adhered to. Along with this improvement in the operation of a vehicle pneumatics overpressure regulating circuit, this also makes it possible to build a compact system in a housing comprising an electric motor, a compressed air source and a pressure switch, since compensatory devices of the kind that had to be provided until now to preclude the variations between the actual pressure and the measured pressure are now dispensed with. A compact housing with all the requisite components also makes a simpler exchange possible, compared to systems that are mounted at different places in a vehicle and each have to be removed, checked and optionally replaced individually there.

LIST OF REFERENCE NUMERALS 1 vehicle pneumatics overpressure regulating circuit
2 electric motor
3 pump
4 supply line
5 consumer
6 check valve
7 measurement line
8 pressure switch
P1 Pressure at the pressure switch at high electric motor voltage
P2 Pressure at the pressure switch at low electric motor voltage
P3 Pressure at the consumer at high electric motor voltage
P4 Pressure at the consumer at low electric motor voltage

What is claimed is:

1. A vehicle pneumatics overpressure regulating circuit (1) of a supply device of a pneumatic consumer (5) in a vehicle having an operating pressure, having
   a compressed air source (3), wherein said compressed air source (3) furnishes compressed air for the consumer (5),
   a pressure switch (8), wherein said pressure switch (8) turns the compressed air source on and/or off to supply the consumer (5) with compressed air, and
   a supply line (4), wherein compressed air is selectively carried out from the compressed air source (3) to the consumer (5),
   characterized in that
       the pressure switch (8), via a pneumatic measurement line (7) separated from the supply line (4), is selectively subjected to a measured pressure, wherein said measured pressure characterizes a state of the operating pressure of the consumer (5), wherein the pressure switch (8) is set such that if a predeterminable pressure switch point is undershot, a switch contact is actuated, whereby said compressed air source (3) is turned on, wherein the compressed air source (3) and the pressure switch (8) are disposed in a common housing, while the consumer (5) is spaced apart from this housing.

2. The vehicle pneumatics overpressure regulating circuit (1) of claim 1, characterized in that the compressed air source (3) and the pressure switch (8) are connected to an electronic control unit with safety, wherein information is selectively exchanged between the compressed air source (3) and the pressure switch (8) by means of said electronic control unit.

3. The vehicle pneumatics overpressure regulating circuit (1) of claim 1, characterized in that the measurement line subjects the pressure switch (8) directly to the operating pressure of the consumer (5).

4. The vehicle pneumatics overpressure regulating circuit (1) of claim 1, characterized in that the compressed air source (3) is an air compressor that is selectively turned both on and off in the form of a vane cell or a diaphragm pump.

5. A method for operating a vehicle pneumatics overpressure regulating circuit of a pneumatic consumer (5) in an interior of a vehicle, wherein the consumer (5) is supplied with compressed air from a compressed air source (3) via a supply line (4), as a result of which the consumer (5) receives an operating pressure, the compressed air source is turned on and off in order to maintain the operating pressure, and the turning on or the turning off of the compressed air source (3) is effected via a pressure switch (8), characterized in that the pressure switch (8) is subjected to a measured pressure, wherein said measured pressure characterizes the operating pressure and originates directly in the consumer (5), and wherein said measured pressure is furnished separately from a pressure in the supply line (4) to the pressure switch (8) via a pneumatic measurement line, whereby an imposition of compressed air from the compressed air source (3) on the consumer (5) is selectively tripped, and locating the pressure switch and the compressed air source in a same common housing, spaced from the consumer.

6. The method of claim 5, characterized in that the pressure switch (8) is subjected directly to the operating pressure of the consumer (5).

7. The method of claim 5, characterized in that as the compressed air source (3), a compressor is used which is turned on to generate compressed air when a minimum pressure at the pressure switch (8) is undershot.

* * * * *